United States Patent [19]
Jackson

[11] 4,389,093
[45] Jun. 21, 1983

[54] METHOD AND APPARATUS FOR COHERENT DETECTION IN OPTICAL PROCESSORS

[75] Inventor: David W. Jackson, San Jose, Calif.
[73] Assignee: Probe Systems, Inc., Sunnyvale, Calif.

[21] Appl. No.: 246,286
[22] Filed: Mar. 23, 1981
[51] Int. Cl.[3] .......... G06G 9/00; G02B 5/32
[52] U.S. Cl. .......... 350/162.14; 350/3.7; 350/3.72; 364/822
[58] Field of Search .......... 350/162.13, 162.14, 350/3.7, 3.72; 364/822

[56] References Cited

U.S. PATENT DOCUMENTS 3,694,657 9/1972 Brooks .......... 350/162.13
4,107,701 8/1978 Sprague et al. .......... 364/822
4,110,016 8/1978 Berg et al. .......... 364/822
4,357,676 11/1982 Brown .......... 350/162.13

Primary Examiner—Bruce Y. Arnold
Attorney, Agent, or Firm—Flehr, Hohbach, Test, Albritton & Herbert

[57] ABSTRACT

A method of and an apparatus for coherently detecting modulated optical signals employing optical mask-generated signals is disclosed. A spatial light modulator modulates a source beam with an information signal composed of one or more frequency components within its frequency bandwidth. The frequency components which are output from the modulator, including the zero frequency component, diverge and become spatially separated. A reference beam is formed from the zero frequency component by a reference beam generator. The reference beam is generated so as to appear to diverge from a reference point located at or near the spatial light modulator. The optical detector performs coherent detection by squaring the sum of the frequency components and the reference beam to provide an output information signal as a function of the input information signal.

26 Claims, 5 Drawing Figures

METHOD AND APPARATUS FOR COHERENT DETECTION IN OPTICAL PROCESSORS

BACKGROUND OF THE INVENTION

This invention relates to the field of signal processing, and in particular, to optical signal processing utilizing coherent detection.

Signal processing typically involves the modulation of a source signal by an information signal to produce a modulated signal. The modulated signal, after transmission and any appropriate processing, is demodulated to recover the information signal, as modified by the processing.

Coherent detection, sometimes called synchronous detection, is a method of detection in which the demodulation employs a reference signal, sometimes called a local oscillator signal, that is in synchronisim with the source signal.

In optical processors, the input information signals are typically time-varying electrical signals which modulate optical source signals to produce optical, modulated signal. The optical, modulated signals are processed and then demodulated to produce electrical output information signals. The modulation converts the electrical signals to optical signals and the demodulation converts the optical signals back to electrical signals. The conversion from electrical to optical signals is undertaken because the desired signal processing can be performed better optically than it can be electrically.

In laboratory environments, coherent-detection optical processors have been known in the prior art. In such processors, coherent light from a laser source is diverted into two paths by means of beam-splitters and mirrors. One path passes the optical source beam through a modulator to modulate the source beam with an appropriate input information signal. The other path from the laser source is transmitted withot modulation to form a coherent reference signal. The reference signal is added to the modulated signal to enable coherent detection. Because the reference signal and the modulated signal travel in different paths, careful alignment of the beam-splitters, mirrors, and other optical elements is required in order to achieve satisfactory coherent detection. Relative displacement between the modulated signal and the reference signal by one-half of a wavelength (for example, less than a micron) can cause complete phase reversals which change the phase of the output information signal by 180 degrees. Because ot the careful alignment and high stability required in prior art coherent-detection optical processors, they have been generally regarded as impractical except in laboratory environments.

Optical processors for real-life cross-correlation have recognized the extreme alignment sensitivity of the modulated signal and the reference signal beams. Vibration of the apparatus or inhomogeneities of the optical mediums usually cause optical path differences which substantially interfere with the desired processing. In order to overcome such problems, collinear heterodyning has been proposed.

Collinear hetrodyning is described, for example, in the article "Collinear Heterodyning and Optical Processors" by Herbert R. Carlton, William T. Maloney and Gerald Meltz, *Proceedings of the IEEE*, Vol. 57, #5, May 1969, pages 769–775. In that article, a real-time cross-correlator is described in which the reference signal and the modulated signal are collinear and hence are not subject to error-causing optical path differences and other problems created by the use of separate optical paths.

Other optical processors have been known which employ collinear optical processing. Such systems, however, have not provided a satisfactory method of and apparatus for processing wide-bandwidth information signals to provide wide-bandwidth output signals.

In light of the above background, there is a need for a wide-bandwidth, high-resolution stable optical processor employing coherent detection.

BRIEF SUMMARY OF THE INVENTION

The present invention is a method of and an apparatus for coherently detecting modulated optical signals employing optical mask-generated signals.

A coherent light source generates a source beam which is incident on a spatial light modulator. The spatial light modulator modulates the source beam with an information signal. The information signal, typically a wide-band radio frequency signal, is composed of one or more frequency components within its frequency bandwidth. The modulated beam output from the spatial light modulator includes corresponding frequency components resulting from the modulation. The frequency components output from the modulator diverge and become spatially separated. One of the frequency components of the modulated beam is the zero frequency component (DC component) which corresponds to the unmodulated source beam.

A reference beam is formed from the zero frequency component by a reference beam generator. The reference beam is generated so as to appear to diverge from a reference point located at or near the spatial light modulator.

An optical detector is located to receive the reference beam and particular ones of the spatially separated frequency components corresponding to the frequency components of the input signal.

The optical detector performs coherent detection by squaring the sum of the frequency components and the reference beam to provide an output information signal as a function of the input information signal.

In accordance with a preferred embodiment, the reference beam generator is formed by a Fourier transform lens and an optical mask.

The Fourier transform lens transforms the modulated beam to spatially separate the frequency components. At the transform lens focal plane, the zero frequency component appears at one point and the other frequency components appear at different points displaced from the zero frequency point. The optical detector aperture is offset from the zero frequency point to receive only those frequency components which correspond to the frequency components of the input information signal. The detector is typically located at or near the transform lens focal plane.

In order to enable coherent detection, an optical mask is provided for diffracting the zero frequency component to provide a coherent reference beam across the full detector aperture. The resultant signal at the detector aperture is the sum of the coherent reference beam, produced by the optical mask, and the spatially distributed frequency components falling within the aperture. In general, the optical mask is located anywhere between the light source and a position in front of the detector; and hence, the optical mask can be placed on either side of the spatial light modulator or on either side of the Fourier transform lens.

The optical mask utilized to produce the coherent reference signal is produced by holographic, digital or any other suitable technique. In a holographic method, a coherent light beam is split by a beam splitter into two spatially separate paths. The beam in one path is analogous to the modulated beam previously described but it is unmodulated as it passes through the Fourier transform lens. The beam in the other path is focused and recombined with the unmodulated beam to expose a photographic or other plate located at the position that the optical mask is to be placed. Exposure and development of the plate produces the desired optical mask.

In accordance with a preferred embodiment of the present invention, the optical mask is located between a Fourier transform lens and the detector aperture at a position which optimizes the coherent reference beam signal strength. The location of the mask is determined by the geometrical relationship between the zero frequency component and the optical elements. The zero frequency component forms a cone of light from the Fourier transform lens converging at a point at the Fourier transform focal plane. A portion of the converging zero frequency component is diffracted by the optical mask to form the reference beam. The reference beam is a diverging cone which fills the detector aperture such that a virtual image point appears to be a point located in a plane passing through the spatial light modulator. For maximum efficiency, the optical mask is located approximately at a point such that the ratio of the width of the diverging reference cone as it passes through the optical mask and the width of the converging zero frequency cone at the position of the optical mask is a maximum.

With the coherent reference beam provided in the manner summarized above, the objective of providing stable coherent detection for wide-bandwidth optical processors of many types is achieved.

Additional objects and features of the present invention will appear from the following description in which the preferred embodiments of the invention have been set forth in detail in conjunction with the drawings.

DETAILED DESCRIPTION

Figure 1:
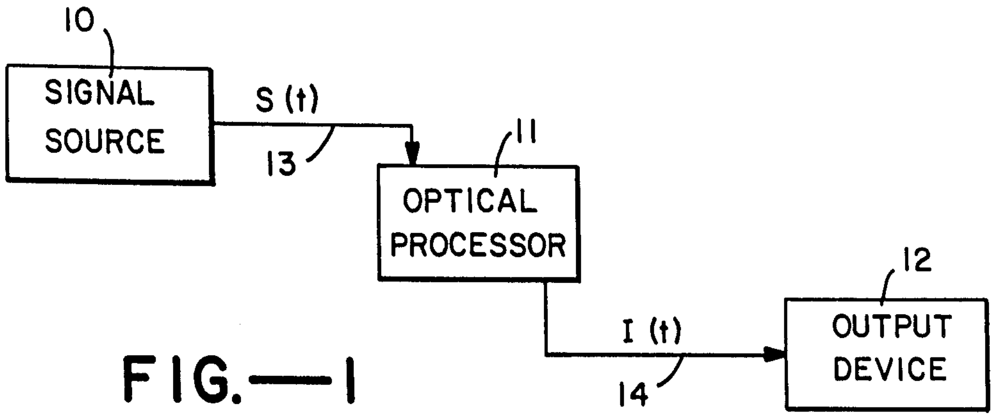
FIG. 1 is a block diagram depicting an optical processor, employing coherent detection in accordance with the present invention positioned to receive an input information signal S(t) and to produce an output information signal I(t).

FIG. 1—General Environment

In FIG. 1, the signal source 10 provides an input information signal S(t) on line 13 to the optical processor 11. The signal S(t) is typically a radio frequency signal with wide bandwidth. A typical signal has a 200 MHz center frequency with a 100 MHz bandwidth.

Figure 2:
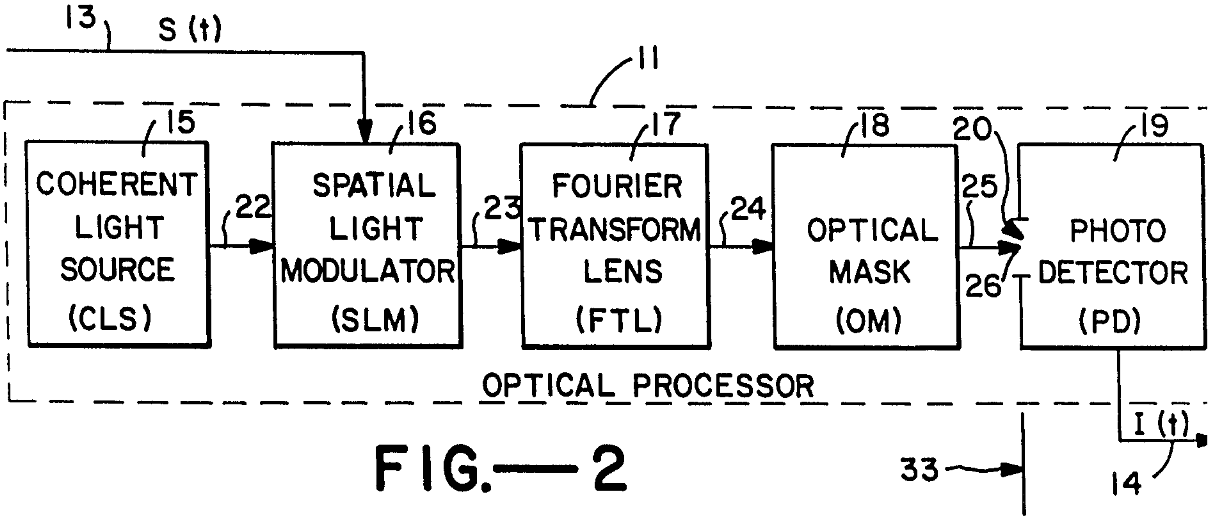
FIG. 2 is a block diagram of an optical processor in accordance with one embodiment of the present invention.
Figure 3:
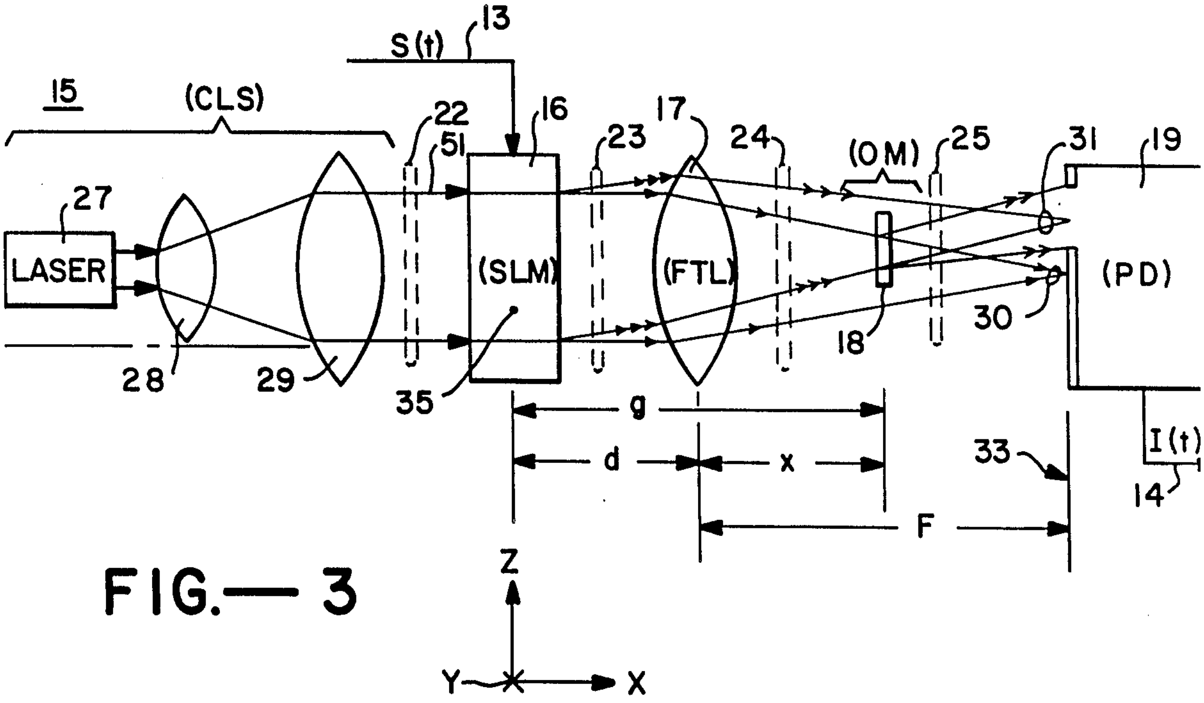
FIG. 3 is a more detailed schematic diagram of the optical processor of FIG. 2.
Figure 4:
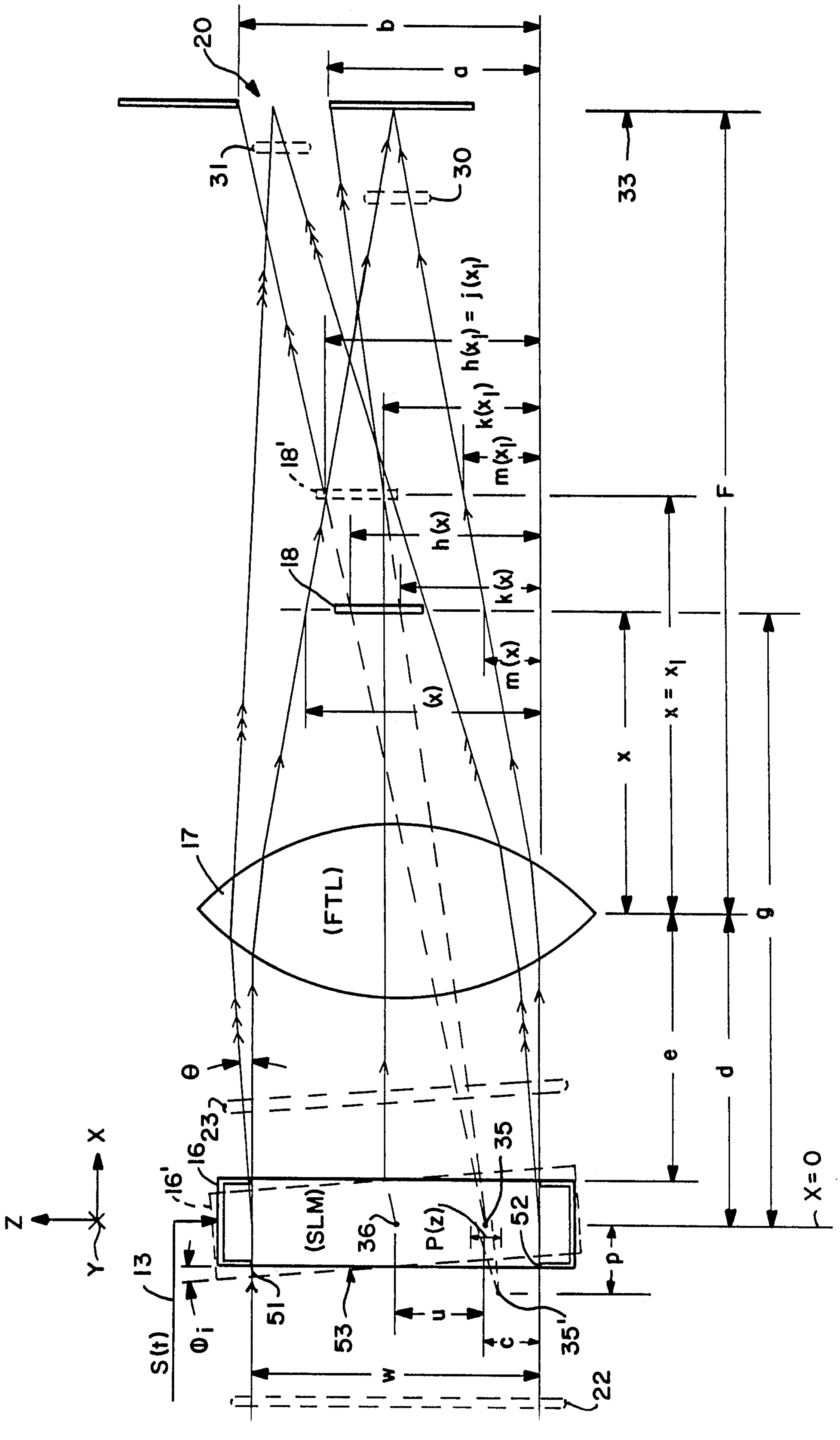
FIG. 4 is a schematic optical diagram further depicting optical ray traces between optical elements of the FIG. 3 device.

Optical processor 11 receives the S(t) signal and optically processes that signal. The optical processing in one example delays the signal S(t). Other types of processing include frequency filtering, excising (removing unwanted frequency components), matched filtering, correlation, and phaseshifting. In order to perform such other types of processing, optical elements, in addition to those shown in FIGS. 2, 3 and 4, are generally required. For example, a frequency plane modulator can be added when frequency filtering or excising is desired.

After optical processing, the processor 11 forms the output information signal I(t) on line 14 where I(t) is a function of the input information signal S(t). The output device 12 receives the signal I(t) for further processing and/or use.

The FIG. 1 apparatus is employed in many applications. In a typical application, the signal S(t) is a frequency down-shifted radar signal in a radar receiver where wide-bandwidth processing of the signal S(t) is required. For example, unwanted frequency components can be removed from the signal S(t) and/or the signal S(t) may be suitably delayed.

FIG. 2—Optical Processor Block Diagram

In FIG. 2, the optical processor 11 of FIG. 1 is shown in further detail. Coherent light source (CLS) 15 is any source which produces spatially coherent light. Typically, source 15 is a conventional gas or solid-state laser together with appropriate lenses. A suitable gas (HeNe) laser commercially available has a center frequency of 4.741 times $10^{14}$ Hz and produces approximately five milliwatts of output power. Alternatively, a conventional source directed through a pinhole filter can be employed for source 15. While the source can have relatively high temporal coherence (for example, a fractional bandwidth of $10^{-6}$), sources with relatively low temporal coherence (for example, fractional bandwidths of $10^{-3}$ or greater) are acceptable.

The spatial light modulator (SLM) 16 receives the coherent source beam 22 from the coherent light source 15 and modulates the source beam with the input information signal S(t). The spatial light modulator 16 is typically a Bragg cell or other acousto-optical modulator. The modulated beam 23 is received by the Fourier transform lens (FTL) 17 which functions to transform beam 23 into beam 24 which has spatially separate frequency components at the back focal plane 33 of lens 17. The beam 24 includes frequency components corresponding to the frequency components in the input information signal S(t) and also includes the zero frequency or unmodulated frequency component derived directly from the source beam 22. The optical mask 18 operates on the unmodulated zero frequency component of the beam 24 to provide a coherent reference component to the beam 25. The beam 25 is incident, through the aperture 20, on the photodetector (PD) 19. The photodetector 19 coherently detects the modulated beam employing the coherent reference beam added by the optical mask 18.

The photodetector (PD) 19 is a conventional detector. Vacuum tube multipliers, avalanche photodiodes, PIN photodiodes and other conventional wide-band photodetectors are suitable large-bandwidth devices.

The bandwidth of commercially available detectors can be as much as 2 gigahertz. Such detectors are squaring devices which respond to the incident optical power appearing at the aperture 20. In the present invention, the detector squares the vector sum of the incident optical signals, specifically, the incident modulated beam and the incident reference beam. The output signal I(t) on line 14 is a time-varying electrical signal having a readily isolatable frequency component proportional to the input signal S(t). Typically, the signal on line 14 is passband or high-pass filtered to isolate the component proportional to the signal S(t) from other unwanted components. Such filtering devices are conventional and can form a part of output device 12 of FIG. 1.

FIG. 3—Optical Beams

In FIG. 3, further details of the optical processor in accordance with the present invention are shown. In FIG. 3, the coherent light source (CLS) 15 includes a conventional highly coherent laser 27, a cylindrical lens 28 for diverging the light 28 to an appropriate size for the aperture of the spatial light modulator 16. The lens 29 receives the beam from lens 28 and forms the collimated source beam 22. Of course, other methods of generating a collimated source beam can be employed. The source beam 22 is incident on the spatial light modulator 16 in a direction substantially parallel to the X axis and normal to the Y axis where the Y axis is normal in the positive direction into the plane of the drawing.

The spatial light modulator 16 receives the input information signal S(t) on line 13 which causes acoustical waves to be propagated through the modulator in the direction of the negative Z axis. The acoustical waves transmitted through the modulator 16 create, as a function of time and position, points of varying index of refraction. The source beam 22 is diffracted differently, therefore, as a function of time and of spatial position along the Z axis. The acoustical wave is propagated as a function of the frequency components in the input information signal S(t). Therefore, the output beam 23 includes optical frequency components directly resulting, by the modulation process, from the electrical frequency components in the input information signal S(t). In order to enhance the diffraction of beam 22, the spatial light modulator 16 is normally rotated in a counter-clockwise direction by a small angle, $\phi_i$ (not shown in FIG. 3).

The Fourier transform lens (FTL) 17 forms at the back focal plane 33 the Fourier transformed image of the beam 23. The transformed image includes the image from the zero frequency component cone 30 (delimited by single-headed rays) which is incident at a central point of the back focal plane 33. Additionally, the beam 24 includes one or more frequency components each converging to a different point within aperture 20. The converging cone 31 (delimited by the triple-headed rays) is shown as typical and represents a single component frequency. The cone 31 is representative of one frequency within the bandwidth of the signal S(t). Each different frequency within the bandwidth of the signal S(t) will produce a different cone, like cone 31, incident at a different position in the direction of the Z axis and in the aperture 20 in FIG. 3.

In FIG. 3, the optical mask (OM) 18 is positioned at some displacement x from lens 17 and some displacement g from the modulator 16 as measured along the X axis. The mask 18 is positioned to receive at least a portion of the zero frequency component represented by cone 30 (delimited by the single-headed rays). Optical mask 18 diffracts the zero frequency component to form a coherent reference beam (delimited by the double-headed rays in FIG. 3) across the full opening of aperture 20. The incident beam at the aperture 20 is, therefore, the sum of the coherent reference beam from mask 18 and the modulated components (such as the cone 31 component) falling within the aperture 20.

Although the optical mask 18 is shown in FIG. 3 positioned in the positive X axis direction relative to the spatial light modulator 16, the mask can be located in general any place between source 15 and a position in front of detector 19. Specifically, the mask 18 can be located before or after modulator 16 and before or after lens 17. If mask 18 is located in a positive X axis direction such that x is greater than some value $x_1$ as hereinafter defined, then the reference beam will not appear over the full detector aperture and therefore the bandwidth of the output signal on line 14 will be restricted.

FIG. 3—Mathematical Model

In order to further explain the coherent detection operation of the present invention, a mathematical model of FIG. 3 is described. This model assumes a weak acousto-optic interaction for the spatial light modulator 16 so that the diffracted light amplitude in modulated beam 23 is linearly related to the input information signal amplitude S(t).

The acoustic wave in the modulator 16 is defined to be propagating in the $-Z$ axis direction and imposes a dielectric modulation $\epsilon$ proportional to $S(t+z/v)$ where t is time, z is the Z axis coordinate and v is the velocity of the wave in the modulator 16 along the Z axis. Also, the optical beam 22 incident on the modulator 16 is defined to propagate in the XZ plane with a Y axis polarization, and all spatial variations in the Y axis direction may be ignored. Finally, the incident optical beam 22 is defined to propagate through free space at an angle $\phi_i$ to an axis normal to a plane through modulator 16 such that the diffracted energy of the modulated optical beam is concentrated in the $m=-1$ diffraction order with a negative doppler shift. The desired angle, $\phi_i$, is obtained, for example, when modulator 16 is rotated in the counter-clockwise direction by the angle $\phi_i$ as shown hereafter in FIG. 4. With these defined conditions, the diffracted optical amplitude $E_{-1}$ in the $m=-1$ diffraction order for the beam 31 from modulator 16 has a free space representation which can be described in the X axis plane, X=0, through the spatial light modulator 16 as follows:

$$E_{-1}[X=0] = CW(z)S_+(t+z/v)e^{-j2(\pi/\lambda_L)\sin\phi_i z - j2\pi f_L t} \quad \text{Eq.(1)}$$

In Eq.(1), C is a complex constant, W(z) is the spatial apodization of the window of acousto-optic modulator 16, and $\lambda_L$ is the free space wavelength of source beam 22. The plus subscript for the signal $S_+(t+z/v)$ is used to signify that the diffracted optical beam 23 has a negative doppler shift. The analytic signal $S_+(t+z/v)$ may be expressed in terms of the Fourier transform, $\check{S}(f_a)$, of the input signal as follows:

$$S_+(t+z/v) = \int_{-\infty}^{\infty} \check{S}_+(f_a)e^{-j2\pi f_a(t+z/v)}df_a \quad \text{Eq.(2)}$$

where,

-continued $$\tilde{S}_+(f_a) = \begin{cases} \tilde{S}(f_a) & f_a > 0 \\ \tfrac{1}{2}\tilde{S}(0) & f_a = 0 \\ 0 & f_a < 0 \end{cases}$$

To clearly see that Eq.(1) contains a negative doppler shift, Eq.(2) is substituted into Eq.(1) to derive Eq.(3) as follows:

$$E_{-1[X=0]} = C\, W(z) e^{-j(2\pi/\lambda L)\sin\phi_i z} \int_{-\infty}^{\infty} \tilde{S}_+(f_a) e^{j2\pi f_a(z/v) - j2\pi(f_L - f_a)} df_a \qquad \text{Eq.(3)}$$

The optical time frequencies in Eq.(3) are given by $f_L - f_a$ where $f_a > 0$ so that the dopper shift is negative.

The signal beam optical amplitude $E_{-1}$ described by Eq.(3) is located a distance d in front of lens 17 in FIG. 3. In the back focal plane 33 (Fourier transform plane) of the lens 17, the signal beam optical amplitude $E_{SF}$ is described by the spatial Fourier transform of Eq.(3) multiplied by a quadratic phase factor yielding:

$$E_{SF} = [e^{j(\pi/\bar{\lambda}F)(1-d/F)(z')^2}] \int_{-\infty}^{\infty} (E_{-1[X=0]}) e^{-j2\pi(z'/\bar{\lambda}F)z} dz/\bar{\lambda}F \qquad \text{Eq.(4)}$$

In Eq.(4), z' is the spatial Z axis coordinate in the Fourier transform plane, $\bar{\lambda}$ is the average optical wavelength and F is the lens 17 focal length. By inserting Eq.(1) into Eq.(4) and substituting the following normalized and displaced Fourier transform variable: $\gamma = z'/\bar{\lambda}F + \sin\phi_i/\lambda_L$, the signal beam optical amplitude $E_{SF}$ in the Fourier transform plane is expressed as follows, $$E_{SF} = C\tilde{W}(\gamma) © [v\tilde{S}_+(\gamma v) e^{j2\pi\gamma v t}] e^{-j2\pi f_L t} \qquad \text{Eq.(5)}$$

For Eq.(5), $\tilde{W}(\gamma)$ is the spatial Fourier transform at the window apodization W(z) while the © symbol denotes convolution over the variable $\gamma$. Since the variable $\gamma$ is proportional to spatial distance in the lens focal plane, the convolution of Eq.(5) acts to spread each doppler-shifted, spectral component $v\tilde{S}_+(\gamma v)\exp(j2\pi\gamma vt)$ of the input signal S(t) over a spatial width in the transform plane determined by $\tilde{W}(\gamma)$. The number of spatially resolvable spots in the Fourier transform plane is thus limited by $\tilde{W}(\gamma)$ and the number of spatially resolvable spots is, to a good approximation, determined by the bandwidth product of the apodized spatial light modulator 16.

The signal beam optical amplitude of Eq.(5) is coherently detected by adding the optical reference beam, which is typically not doppler shifted, produced by the mask 18 in FIG. 3. The optical reference beam amplitude $E_{RF}$ in the Fourier transform plane 33 is in general a function of spatial position and may also be expressed in terms of the normalized and displaced Fourier transform plane variable $\gamma$ as follows:

$$E_{RF} = e^{j(\pi/\bar{\lambda}F)(1-d/F)(z')^2} \tilde{R}(\gamma) e^{-j2\pi f_L t} \qquad \text{Eq.(6)}$$

The optical intensity $I(\gamma,t)$ in the Fourier transform plane in the proximity of the detector aperture 20 is expressed as follows:

$$I(\gamma,t) = \tfrac{1}{2}|E_{SF} + E_{RF}|^2 \qquad \text{Eq.(7)}$$

The optical intensity distribution defined by Eq.(7) is collected by the large-area photodetector 19 in FIG. 3. The photocurrent output information signal I(t) from the photodetector 19 is given by:

$$I(t) = \int_{-\infty}^{\infty} I(\gamma,t) d\gamma \qquad \text{Eq.(8)}$$

By combining Eqs. (5), (6), (7) and (8), the output information signal, I(t), is the sum of the three terms in Eq.(9a) as follows:

$$I(t) = i_R + i_S(t) + i_{HET}(t) \qquad \text{Eq.(9a)}$$

and where the terms in Eq.(9a) are as follows:

$$i_R = \tfrac{1}{2}\int_{-\infty}^{\infty} |R(\gamma)|^2 d\gamma \qquad \text{Eq.(9b)}$$

$$i_S(t) = \tfrac{1}{2}|C|^2 \int_{-\infty}^{\infty} \left| \int_f \tilde{W}(\gamma - f/v)\tilde{S}_+(f) e^{j2\pi f t} df \right|^2 d\gamma \qquad \text{Eq.(9c)}$$

$$i_{HET}(t) = Re \int_{-\infty}^{\infty}\int_{-\infty}^{\infty} \tilde{R}^*(\gamma)\tilde{W}(\gamma - f/v) C\tilde{S}_+(f) e^{j2\pi f t} d\gamma\, df \qquad \text{Eq.(9d)}$$

The $i_R$ component of the photocurrent defined by Eq.(9b) represents the total reference beam (delimited by double-headed rays in FIG. 3) optical power collected by the photodetector. The reference beam power is independent of time. The $i_S(t)$ component defined by Eq.(9c) of the output signal I(t) represents the total diffracted signal beam optical power collected by the photodetector. The $i_S(t)$ component of the photocurrent is a low frequency term with the majority of its power near DC and has an absolute maximum time frequency less than $(f_{max} - f_{min})$ where $f_{max}$ and $f_{min}$ are the maximum and minimum frequencies of the input information signal S(t). The $i_{HET}(t)$ component defined by Eq.(9d) of the photocurrent is the desired linear output of the detection process. From Eq.(9d) it appears that each spectral component $\tilde{S}_+(f)$ of the input signal S(t) contributes a time frequency component $\exp(j2\pi ft)$ to the output component signal $i_{HET}(t)$ so that a linear filter operation exists. To more clearly define the linear filter response, Eq.(9d) is rewritten as follows:

$$i_{HET}(t) = Re \int_{-\infty}^{\infty} 2H_+(f)\tilde{S}_+(f) e^{j2\pi f t} df \qquad \text{Eq.(10a)}$$

where $$H_+(f) = \tfrac{1}{2}C[\tilde{W}(-\gamma) © [\tilde{R}^*(\gamma)]] \qquad \text{Eq.(10b)}$$

evaluated at $\gamma = f/v$.

Eq.(10a) implies that the response for positive frequencies $f > 0$ is defined by $H_+(f)$. From Eq.(10b), it appears that the response $H_+(f)$ is basically equal to $\mathring{R}^*(f/v)$ convolved with the inverted window transform $\mathring{W}(-f/v)$.

Eq.(10a) is not quite in the final form of a linear response due to the Re operator (real part of) and the restriction to positive frequencies $f>0$. To clearly express the linear response for positive and negative frequencies, Eq.(10a) is rewritten using the fact that S(t) is real so that $\mathring{S}(f)$ is equal to $\mathring{S}^*(-f)$. Rewriting Eq.(10a) yields the following Eq.(11):

$$i_{HET}(t) = \int_{-\infty}^{\infty} H(f)\mathring{S}(f)e^{j2\pi ft}df \qquad \text{Eq.(11)}$$

where, $$H(f) = \begin{cases} H_+(f) & f \geqq 0 \\ H_+^*(-f) & f < 0 \end{cases}$$

In Eq.(11), the linear frequency response of the optical system from the input signal S(t) to the heterodyne component $i_{HET}(t)$ of the photocurrent is defined by H(f). Furthermore, H(f) is equal to $H^*(-f)$ as is required of real valued input and output signals.

Since the heterodyne component $i_{HET}(f)$ of the photocurrent is a linear version of the input signal, the time frequencies f of $i_{HET}(t)$ are bandlimited to the frequency range $f_{min}<f<f_{max}$. As before, $f_{max}$ and $f_{min}$ are the maximum and minimum frequencies of the input signal S(t). Thus if the input signal has less than an octave bandwidth so that $(f_{max}-f_{min})<f_{min}$, then $i_{HET}(t)$ may be electronically separated from $i_R$ and $i_S(t)$ by the use of a highpass filter. Typically, a bandpass filter is used at the output instead of a highpass filter since this minimizes the wideband shot noise and rejects signal harmonics which can be present when multi-longitudinal mode lasers are used as the optical source.

The linear response characteristics at the optical processor may be understood by a close examination of $H_+(f)$ from Eq.(10b). The simplest situation occurs with a plane wave optical reference beam, that is, with $R(\gamma)$ equal to 1. In this case, it is apparent from Eq. (10b) that:

$$H_+(f) = \tfrac{1}{2}CW(0) \text{ for } R(\gamma)=1 \qquad \text{Eq.(12)}$$

In other words, the response H(f) is constant, independent of frequency, so that the system acts like an electrical short circuit from the input to output. In actual practice with $R(\gamma)=1$ there is a constant time delay from the input S(t) to the output $i_{HET}(t)$ caused by the constant acoustic transit time from the acoustic transducer boundary to the effective reference beam origin 35 shown at the X=0 plane in the modulator 16.

For other types of processing, a mask or other optical element is typically provided in front of the aperture 20. A blocking mask may be employed, for example, to block one or more selected frequency components thereby removing such components from the output signal.

Optical Mask Location—FIG. 4

In FIG. 4, an expanded view of the optical components between the spatial light modulator 16 and the photodetector aperature 20 of the FIG. 3 apparatus is shown. In FIG. 4, the spatial light modulator (SLM) 16, the Fourier transform lens (FTL) 17, the optical mask (OM) 18 and the detector aperture 20 are the same as shown in FIG. 3.

The spatial light modulator 16 is rotated counterclockwise to the position shown by modulator 16 at an angle $\phi_i$ relative to the X and Z axes. When thus rotated, the diffracted frequency components (triple-headed rays) form an angle $\theta$ with the zero frequency component (single-headed rays). The angle $\theta$ ranges between $\theta_{max}$ and $\theta_{min}$.

In FIG. 4, modulator 16 has a window or aperture 53 with a dimension w in the Z axis direction extending between a first aperture end 51 and a second aperture end 52. The axis of modulation of modulator 16 is in the negative Z axis direction.

The mask 18 is located at some displacement x from the center of the Fourier transform lens 17. In FIG. 4, the optical mask 18', shown in broken line, represents the optimum location when the displacement x is equal to $x_1$ for the optical mask 18. In FIG. 4, the single-headed rays for cone 30 represent the zero frequency beam. The double-headed rays represent the the reference beam diffracted by the mask 18 and which falls within the aperture 20. The triple-headed rays depict a typical cone 31 of one modulated frequency component.

The following TABLE I defines various parameters in FIG. 4.

TABLE I h(x)=the distance in the Z axis direction, at the X axis displacement x, to the top most part of the optical mask utilized and the distance corresponds to the lowest portion through which the zero frequency beam must pass in order to deflect the reference beam onto the entire detector aperture.

k(x)=the distance in the Z axis direction, at the X axis displacement x, to the bottom most part of the optical mask utilized and the distance corresponds to the highest portion through which the zero frequency beam must pass in order to deflect the reference beam onto the entire detector aperture.

m(x)=the distance in the Z axis direction, at the X axis displacement x, to the bottom of the zero frequency beam.

j(x)=the distance in the Z axis direction, at the X axis displacement x, to the top of the zero frequency beam.

a=the distance in the Z axis direction to the point where the lowest frequency component signal falls within the detector aperture.

b=the distance in the Z axis direction to the point where the highest frequency component signal falls within the detector aperture.

c=the distance in the Z axis direction to the virtual focal point 35 of the reference beam.

d=the virtual focus distance of the reference beam.

e=the distance in the X axis direction between the optical light modulator 16 and the Fourier transform lens 17.

F=focal length of the Fourier transform lens 17.

g=the distance in the positive or negative X axis direction of optical mask 18 from the spatial light modulator 16.

u=the distance in the Z axis direction from the center point 36 of modulator 16 to the virtual image point 35.

w=width in the Z axis direction of the aperture of the spacial light modulator 16.

x=the distance in the X axis direction between the Fourier transform lens 17 and the optical mask 18.

In FIG. 4, the portion of the optical mask 18 which is utilized to deflect the reference beam over the entire aperture is equal to the quantity h(x)−k(x). Note that the extension of the double-headed rays from the aperture 20 back to the virtual image point 35, in the X=0 plane, determines what portion of the optical mask is utilized.

The quantity h(x)−k(x) is the "width" of the cone of the reference beam. The width of the zero frequency cone 30, delimited by the single-headed rays at the displacement x of the optical mask 18, is given by j(x)−m(x). The ratio, Q, of the width of the utilized portion of the optical mask, given by the quantity h(x)−k(x), and the width of the zero frequency cone given by the quantity j(x)−m(x) is the controlling factor in the strength of the reference beam as it appears in the aperture 20 at the Fourier transform plane 33.

The ratio Q will be a maximum at a point where x is equal to $x_1$ at which h(x) is equal to j(x). The optical mask 18' is located at the point where is x equal to $x_1$ so that $h(x_1)$ is equal to $j(x_1)$.

Although the optical mask 18 can be placed at any location between the spatial light modulator 16 and the plane at $x=x_1$, the reference beam will have the highest strength when x is equal to $x_1$ if the input source beam 22 has a uniform intensity in the Z axis direction. The highest strength of the reference beam occurs at x equal to $x_1$ because, at that location, the highest percentage of the zero frequency beam passes through the utilized portion of the optical mask. The higher the percentage of the zero frequency beam passing through the utilized portion of the optical mask, the higher the reference beam strength at the aperture 20. The high reference beam strength is desirable to maximize the signal-to-noise ratio of the coherent detection process.

When the source beam 22 has a non-uniform intensity distribution in the Z axis direction, for example a Gaussian distribution, then the maximum intensity reference beam is obtained when the optical mask is located at a value of x somewhat less than $x_1$.

The following TABLE II lists typical parameters for the FIG. 4 device in accordance with the present invention.

TABLE II

| | | |
|---|---|---|
| bandwidth | = | 100 M Hz |
| center frequency | = | 200 M Hz |
| $\phi_i$ | = | 0.56 degrees |
| $\theta_{max}$ | = | 1.39 degrees |
| $\theta_{min}$ | = | 0.84 degrees |
| v | = | $6.5 \times 10^3$ m/sec |
| λ | = | $6.328 \times 10^{-7}$ m |
| a | = | 2.30 cm |
| b | = | 2.88 cm |
| c | = | 1.425 cm |
| d | = | 10 cm |
| e | = | 8 cm |
| F | = | 50 cm |
| g | = | 37.8 cm |
| u | = | 0.2 cm |
| $x_1$ | = | 27.8 cm |
| $h(x_1)$ | = | 2.35 cm |
| $j(x_1)$ | = | 2.35 cm |
| $k(x_1)$ | = | 1.98 cm |
| $m(x_1)$ | = | 0.90 cm |

The distance g in FIG. 4 can be measured along the positive or negative X axis such that optical mask 18 is located on the right of (after) or left of (before) spatial light modulator 16. For high frequency applications (500 M Hz or more), mask 18 is typically placed before lens 17 or before modulator 16. In any case, however, the absolute value of g should not be too small since, if g is too small, the reference beam will not have sufficient energy to permit reliable coherent detection when a point source reference source is employed. In the limit, if g equals zero, the reference beam will have zero energy. As a general guide, g should be greater than the quantity given by the following expression, $$g > v^2/(f_{min}^2 \lambda)$$

where, v=velocity of wave in modulator 16

$f_{min}$=minimum frequency of input information signal

λ=wavelength of source beam

Although the reference point 35 has been specified as a virtual image point lying in the X=0 plane passing through the center of modulator 16, reference point 35 can be displaced to a location 35' by a distance p displaced in the minus X axis direction such that the virtual image cone (delimited by double-headed broken-line rays) has some width p(z) (measured in the Z axis direction) in the X=0 plane. In general, in order not to introduce additional components into the output signal, the width p(z) of the cone at the X=0 plane should not exceed $v/(f_{max}-f_{min})$ where v is the velocity in the modulator and $(f_{max}-f_{min})$ is the bandwidth of the input information signal. If greater widths for p(z) are employed, distortion components are introduced into the output signal. In many applications, such additional components are undesired. In some applications, however, multiple reference points may be desired.

Figure 5:
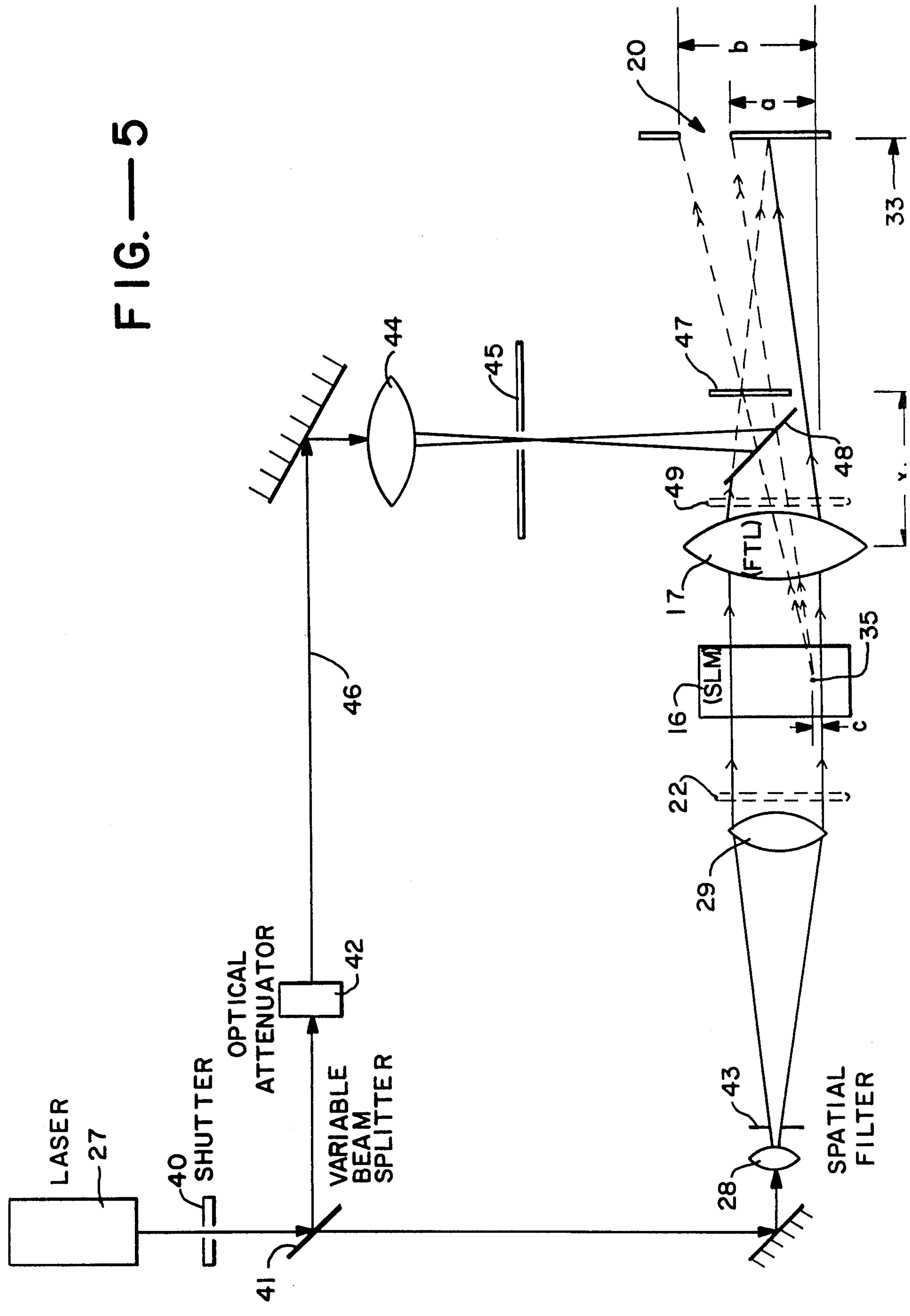
FIG. 5 is a schematic representation of the optical configuration employed for holographically generating an optical mask for use in the apparatus of the present invention.

FIG. 5—Optical Mask Generation

In FIG. 5, the laser 27, the lenses 28, 29 and 17, and the spatial light modulator 16 are identical to the same elements shown in FIG. 3. Additionally, a beam-splitter 41 is provided to form a reference beam 46 after attenuation in optical attenuator 42. The reference beam 46 is focused through a lens 44 and a spatial filter 45 onto the beam-combining mirror 48. The mirror 48 reflects some of the light beam from lens 44 and filter 45 onto photographic plate 47 where it is combined with the unmodulated beam from the Fourier transform lens 17. The spatial filter 43 appears after the lens 28 to restrict the size of the source beam 22. The spatial filter 45 and the lens 44 are selected so that the reference beam incident on the photographic plate 47 has a virtual image which fully fills the aperture 20 and has a virtual image point 35 in the Z axis direction which appears in the spatial light modulator 16. The shutter 40 is provided for controlling the exposure time of the photographic plate 47. While plate 47 is typically a photographic plate, any type of plate and process suitable for forming a hologram can be employed. Alternatively, a suitable mask or grating can be generated by non-holographic processes such as computer calculation and generation.

With the arrangement of elements as shown in FIG. 5, the photographic plate 47 is exposed for an appropriate period of time. After development of the plate 47, the desired holographic optical mask is ready for use in the apparatus of FIGS. 3 and 4. In actual practice, the spatial light modulator of FIG. 5 serves no purpose and therefore can be removed when optical masks are being exposed.

In FIG. 5, the amount of time delay can be controlled by changing the dimension c. If c is made equal to w, the width of the acousto-optic modulator window, then a minimum time delay is exhibited by the system. Typically, the delay time ranges from a fraction of a microsecond to approximately five microseconds. In one embodiment, $x_1$ was calculated for a minimum time delay to be 752 millimeters. In actual embodiments, with $x_1$ less than 752 millimeters, time delays ranging between 400 nanoseconds and 1.2 microseconds, out of a maximum of five microseconds, were exhibited.

In one example, the plate 47 was Kodak 120-02 glass photographic plates 0.25 inch thick. Such plates exhibit low granularity (grain noise) and high resolving power (greater than 2000 lines/mm). The following are processing steps used for developing the plates:

(1) 7 minutes with gentle agitation in D-19 (400 milliliter of Kodak D-19 concentrate per 2 liters of warm tap water.

(2) 1 minute in 1.3% solution of acetic acid.

(3) 4 minutes in Kodak rapid fix and hardener.

(4) 30 seconds in "Hustler" brand rapid bath hypo-remover solution.

(5) 5 to 10 minutes in running tap water.

The best exposure obtained for the Kodak 120 plates employed approximately 30 microjoules per square centimeter with the ratio of the source beam to reference beam energy approximately 2 to 1.

FURTHER AND OTHER EMBODIMENTS

Although the Fourier transform lens 17 and the spatial mask 18 have been described as separate optical elements which form a reference beam generator means, their functions can be combined into a single optical element within the scope of the present invention. For example, a single optical mask can be formed which performs both the Fourier transform and diffraction functions. In some embodiments, the mask performs only the Fourier transform function with the reference beam derived directly from the source.

Although the detector and detector aperture have been described for simplicity of design as located at the focal distance F from the transform lens, the detector and detector aperture may be located at other locations before or after the focal distance F.

Although the photodetector has been described as a single device with a single output, multiple detectors may be employed. For example, an array of detectors can be located at or near the back focal plane 33, each one for detecting different frequency components of the input signal.

While the invention has been particularly shown and described with reference to the preferred embodiments thereof, it will be understood by those skilled in the art that those changes in form and details may be made therein without departing from the spirit and the scope of the invention.

What is claimed is:

1. An optical processor apparatus comprising:

a light source for providing a coherent source beam, a spatial light modulator for modulating the source beam with an input information signal to produce a modulated beam, said modulated beam diverging into spacially separated frequency components including a zero frequency component from said source beam, reference beam generator means for forming a reference beam from said zero frequency component such that said reference beam appears to diverge from a reference point, an optical detector having an aperture positioned for receiving said reference bean and particular ones of said spatially separated frequency components whereby said particular ones of said spatially separated frequency components are coherently detected to produce an output information signal as a function of the input information signal.

2. The apparatus of claim 1 in which said reference beam generator means includes, a transform lens for transforming said frequency components, including said zero frequency component, of said modulated beam, and an optical mask positioned to diffract said zero frequency component to form said reference beam.

3. The apparatus of claim 2 in which said optical mask is a holographic mask.

4. The apparatus of claim 2 in which said optical mask is located between said transform lens and said aperture at a position which optimizes the energy in said reference beam.

5. The apparatus of claim 2 in which said source beam has a wavelength $\lambda_L$, in which said input information signal has a minimum frequency $f_{min}$, in which said spatial light modulator propagates signals with a velocity v, and in which said optical mask is displaced from said modulator a displacement distance to insure sufficient energy in said reference beam.

6. The apparatus of claim 5 in which said displacement distance is greater than the quantity $v^2/(\lambda_L f_{min}^2)$.

7. The apparatus of claim 2 in which said optical mask diffracts the zero frequency component from said transform lens to form said reference beam in a manner such that said reference beam diverges from said mask to cover said aperture and has said reference point located at said spatial light modulator.

8. The apparatus of claim 7 in which said spatial light modulator is oriented to receive said source beam in a first direction through an aperture opening between first and second aperture ends, said aperture extending parallel to an axis of modulation substantially normal to said first direction, said modulator functioning to spatially modulate said source beam by propagating signals from the first end to the second end of said aperture along the axis of modulation, and in which said reference point is located along the axis of modulation between said first and second ends and displaced from said first end by an offset distance whereby the output information signal is delayed from the input information signal an amount proportional to said offset distance.

9. The apparatus of claim 7 wherein said zero frequency component is delimited by a converging cone of light converging at a point in a plane extending through said aperture, wherein said reference beam is delimited by a diverging cone originating from said reference point in said spatial light modulator and diverging through said mask to fill said aperture, and wherein said optical mask is located such that the ratio of the width of said diverging cone to the width of said converging cone at said mask is approximately a maximum.

10. The apparatus of claim 2 in which said transform lens has a focal distance, said optical mask is located between said lens and said focal distance and said optical detector is located approximately at said focal distance.

11. The apparatus of claim 1 in which said input information signal has a bandwidth defined by a minimum frequency $f_{min}$ and a maximum frequency $f_{max}$, in which said spatial light modulator propagates signals with a velocity v, in which said reference beam generator means generates said reference beam which appears to be delimited by a cone of diverging light from said reference point such that the width of said cone at the plane of said spatial light modulator does not exceed said velocity v divided by said bandwidth.

12. An optical processor apparatus comprising:

a light source for providing a coherent source beam, a spatial light modulator for modulating the source beam with an input information signal to produce a modulated beam, said modulated beam diverging into spacially separated frequency components including a zero frequency component from said source beam, a transform lens for transforming said frequency components, including said zero frequency component, of said modulated beam, and an optical mask positioned to diffract said zero frequency component from said transform lens to form said reference beam, an optical detector having an aperture positioned for receiving said reference beam and particular ones of said spatially separated frequency components whereby said particular ones of said spatially separated frequency components are coherently detected to produce an output information signal as a function of the input information signal.

13. The apparatus of claim 12 in which said optical mask is a holographic mask.

14. The apparatus of claim 12 in which said optical mask is located between said transform lens and said aperture at a position which optimizes the energy in said reference beam.

15. The apparatus of claim 12 in which said source beam has a wavelength $\lambda_L$, in which said input information signal has a minimum frequency $f_{min}$, in which said spatial light modulator propagates signals with a velocity v, and in which said optical mask is displaced from said modulator a displacement distance to insure sufficient energy in said reference beam.

16. The apparatus of claim 15 in which said displacement distance is greater than the quantity $v^2/(\lambda_L f_{min}^2)$.

17. The apparatus of claim 12 in which said optical mask diffracts the zero frequency component from said transform lens to form said reference beam in a manner such that said reference beam diverges from said mask to cover said aperture and has a reference point located at or near said spatial light modulator.

18. The apparatus of claim 17 in which said reference point is a virtual image point.

19. The apparatus of claim 17 in which said spatial light modulator is oriented to receive said source beam in a first direction through an aperture opening between first and second aperture ends, said aperture extending parallel to an axis of modulation substantially normal to said first direction, said modulator functioning to spatially modulate said source beam by propagating signals from the first end to the second end of said aperture along the axis of modulation, and in which said reference point is located along the axis of modulation between said first and second ends and displaced from said first end by an offset distance whereby the output information signal is delayed from the input information signal an amount proportional to said offset distance.

20. The apparatus of claim 17 wherein said zero frequency component is delimited by a converging cone of light converging at a point in a plane extending through said aperture, wherein said reference beam is delimited by a diverging cone originating from said reference point in said spatial light modulator and diverging through said mask to fill said aperture, and wherein said optical mask is located such that the ratio of the width of said diverging cone to the width of said converging cone at said mask is a maximum.

21. The apparatus of claim 12 in which said transform lens has a focal distance, said optical mask is located between said lens and said focal distance and said optical detector is located approximately at said focal distance.

22. The apparatus of claim 12 in which said input information signal has a bandwidth defined by a minimum frequency $f_{min}$ and a maximum frequency $f_{max}$, in which said spatial light modulator propagates signals with a velocity v, in which said reference beam is delimited by a cone of diverging light from said reference point such that the width of said cone at the plane of said spatial light modulator does not exceed said velocity v divided by said bandwidth.

23. A method of optical processing comprising:

providing a coherent source beam, modulating the source beam in a spatial light modulator with an input information signal to produce a modulated beam, said modulated beam diverging into spacially separated frequency components including a zero frequency component from said source beam, forming a reference beam from said zero frequency component such that said reference beam appears to diverge from a reference point, receiving said reference beam and particular ones of said spatially separated frequency components in the aperture of an optical detector to coherently detect said particular ones of said spatially separated frequency components and produce an output information signal as a function of the input information signal.

24. The method of claim 23 including the steps of transforming said frequency components, including said zero frequency component, of said modulated beam with a transform lens, and diffracting said zero frequency component from said transform lens with an optical mask to form said reference beam.

25. The method of claim 24 in which said diffracting step is performed in a manner such that said reference beam diverges from said mask to cover said aperture and has said reference point located at said spatial light modulator.

26. The method of claim 25 in which said reference point is a virtual image point.

* * * * *

65

UNITED STATES PATENT AND TRADEMARK OFFICE
CERTIFICATE OF CORRECTION

PATENT NO. : 4,389,093

DATED : June 21, 1983

INVENTOR(S) : David W. Jackson

It is certified that error appears in the above-identified patent and that said Letters Patent is hereby corrected as shown below:

The sheets of drawings containing Figures 1 - 6 should be deleted to appear as per the attached sheets, but will apply to the Grant Only.

Signed and Sealed this

*Twentieth* Day of *November 1984*

[SEAL]

*Attest:*

GERALD J. MOSSINGHOFF

*Attesting Officer*

*Commissioner of Patents and Trademarks*

UNITED STATES PATENT AND TRADEMARK OFFICE

CERTIFICATE OF CORRECTION

PATENT NO. : 4,389,093

DATED : June 21, 1983

INVENTOR(S) : David W. Jackson

It is certified that error appears in the above-identified patent and that said Letters Patent are hereby corrected as shown below:

Sheet 1 of the drawings should appear as follows:

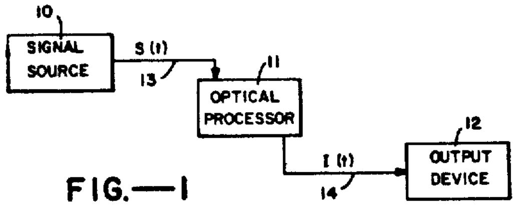

FIG.—1

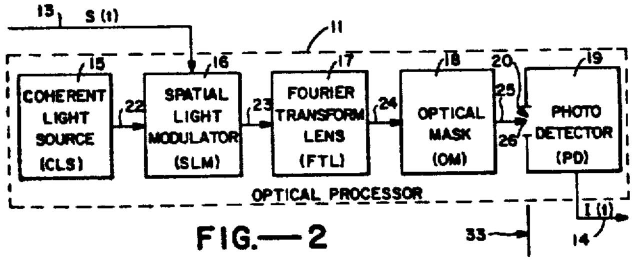

FIG.—2

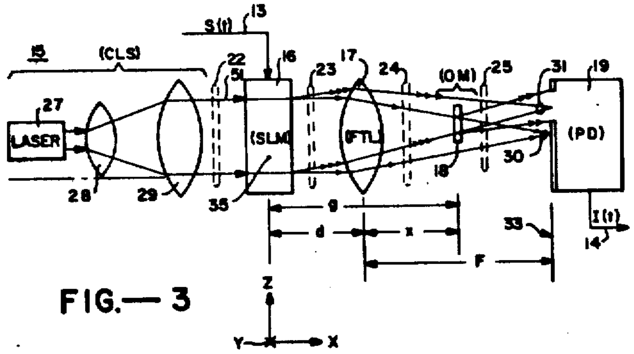

FIG.— 3

UNITED STATES PATENT AND TRADEMARK OFFICE

CERTIFICATE OF CORRECTION

PATENT NO. : 4,389,093

Page 3 of 4

DATED : June 21, 1983

INVENTOR(S) : David W. Jackson

It is certified that error appears in the above-identified patent and that said Letters Patent are hereby corrected as shown below:

Sheet 2 of the drawings should appear as follows:

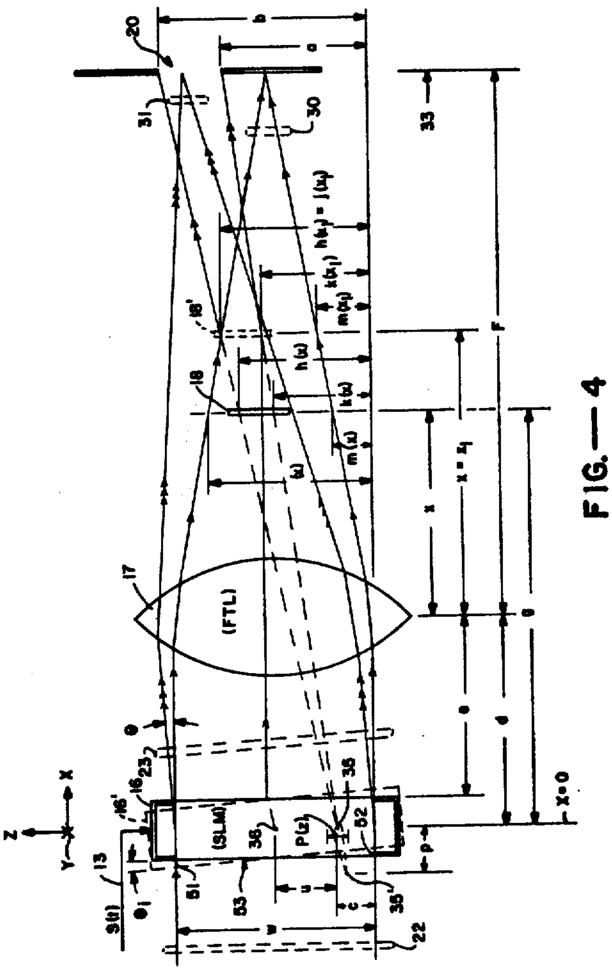

FIG. — 4

UNITED STATES PATENT AND TRADEMARK OFFICE

CERTIFICATE OF CORRECTION

PATENT NO. : 4,389,093

DATED : June 21, 1983

INVENTOR(S) : David W. Jackson

It is certified that error appears in the above-identified patent and that said Letters Patent are hereby corrected as shown below:

Sheet 3 of the drawings should appear as follows:

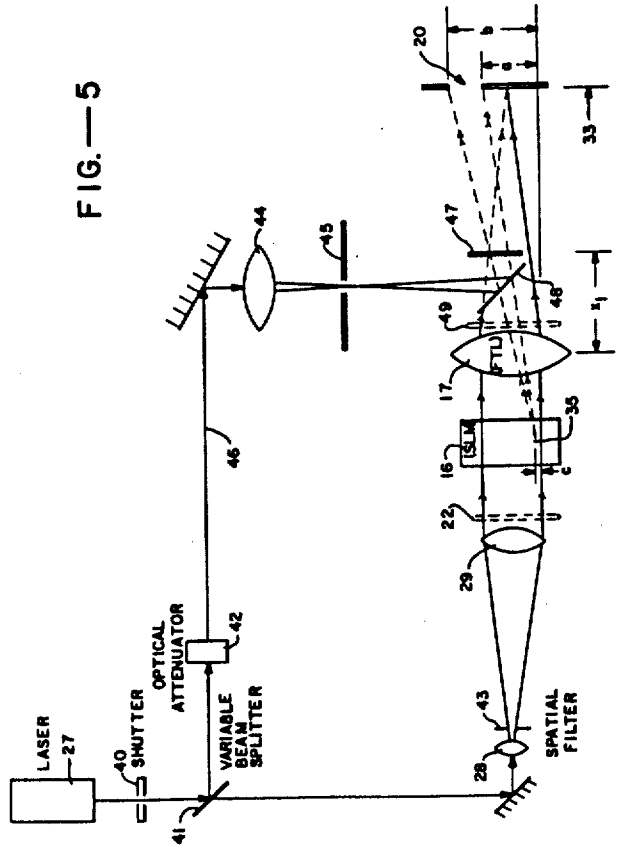

FIG.—5